July 9, 1963 H. OESTRICH 3,096,956
AIRSTRIP FOR VERTICAL TAKE-OFF AIRCRAFT
Filed July 14, 1961
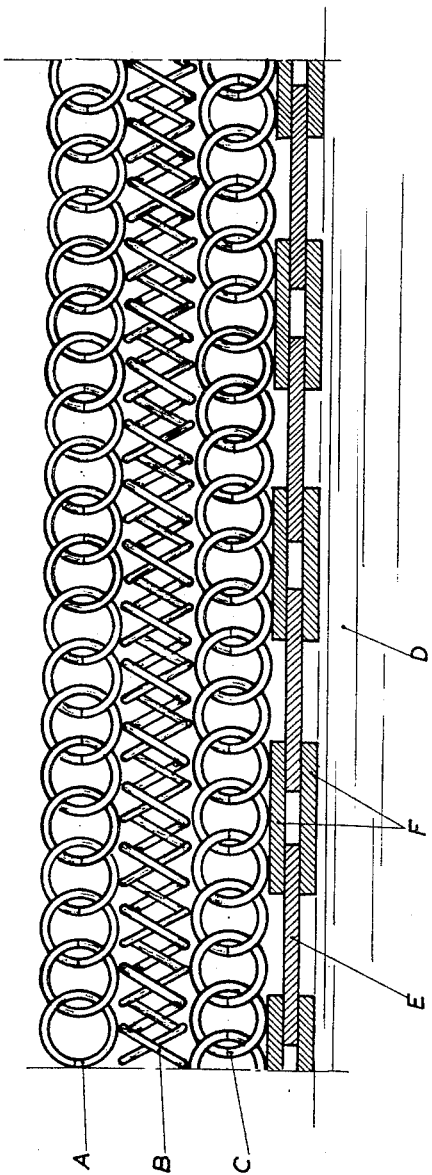
INVENTOR
Hermann Oestrich
Watson, Cole, Grindle & Watson
ATTORNEYS 3,096,956
AIRSTRIP FOR VERTICAL TAKE-OFF AIRCRAFT
Hermann Oestrich, Paris, France, assignor to Societe Nationale d'Etude et de Construction de Moteurs d'Aviation, Paris, France, a company of France
Filed July 14, 1961, Ser. No. 124,186
Claims priority, application France July 29, 1960
3 Claims. (Cl. 244—114)

The present invention relates to a movable airstrip of small dimensions suitable for aircraft which take off and land vertically, the said airstrip complying with a certain number of technical and military requirements: it can be rapidly set up and removed by unskilled labour, the material of which it is made is light, not bulky and can be easily carried by labour on foot, it is flexible so that it can tolerate roughly levelled ground and withstand any possible subsidence of the ground which it covers.

According to the present invention, the airstrip consists essentially of a sort of mattress or carpet made up of superposed layers of metal wires wound in the form of spirals whereof the turns are engaged in one another, the whole having an appearance similar to that of metal sponges or wire wool. The axes of the turns of metal in one layer are preferably perpendicular to those of the turns in the adjacent layer or layers.

These constituent elements of the airstrip have the advantage of being flexible and light, and capable of being wound on to drums which are easily portable and enable the airstrip to be rapidly set up simply by unwinding it from the said drums.

It will be advantageous to make the turns of a refractory steel capable of withstanding the high temperatures, of the order of 1,800°, which are encountered with the exhaust gases of jet engines when operated with after-burning or exhaust reheat. In the sub-joined claims, the term "refractory" will therefore be taken to mean capable of withstanding the direct thermal and corrosive action of jets such as produced by jet engines of V.T.O.L. aircraft.

These elements in the form of turns of metal may be placed directly on solid ground, for example a surface of concrete or solidified soil; but if the soil is of a shifting nature, it will be advantageous to protect it with plates of sheet-metal capable of expanding to the large degree which will have to be taken into account. In particular, to ensure that the joints are fluid-tight, they may be provided with covers which do not hinder free expansion of the plates.

In fact, it is known that the pressure of the vertical-lift jet on the surface of the soil can cause material from the latter to be thrown up, with the risk of damaging the cell and even the engine if the air-inlet of the latter is not out of reach or protected. Hence the need to make the joints fluid-tight as regards the gases.

The following description with reference to the appended drawing, which is given by way of non-limitative example, will give a good understanding of how the invention may be embodied, the features apparent both from the text and the drawing naturally forming part of the said invention.

The single FIGURE is a very diagrammatic vertical part-section through an airstrip embodied in accordance with the present invention.

The said airstrip consists chiefly of superposed layers (three in number in the example in the drawing) of metal wires wound in spiral form with their turns engaged in one another. Windings belonging to a given layer are disposed longitudinally side-by-side with their axes substantially parallel, while the axes of the windings belonging to adjacent layers are perpendicular. Thus, in the example illustrated in the drawing, the windings in the intermediate layer B have horizontal axes situated in the plane of the figure, the axes of the windings in the upper layer A and the lower layer C likewise being horizontal, but perpendicular to the plane of the figure.

In the case of a shifting soil such as D, a protective covering is disposed below the layers A, B and C, on the ground itself. This covering is made up of basic plates or slabs of sheet metal E juxtaposed with a certain amount of play in order to take expansion into account, joint-covers F being provided to ensure a fluid-tight seal, and being designed to allow free expansion of the pieces of the sheet-metal elements E. These joint-covers F will advantageously be linked to one another by any means in order to maintain their spacing.

Thus, the high-temperature gases emerging from the driving nozzle of the vertical-take-off aircraft resting on the airstrip embodied in this manner will be unable to come into contact with the shifting soil by passing through the spaces between the turns of metal, and will be discharged laterally through the rudimentary ducts defined by the said turns. It may be advantageous to make the upper layers such as A of more refractory metals than the lower layers such as C.

To fix the various layers to the ground, it will suffice to provide fixing means on the external edges of the airstrip embodied in this manner, internal expansion being absorbed by the turns.

What I claim is:

1. A transportable airstrip suitable for V.T.O.L. jet aircraft and of the wire-mesh mat type, comprising a plurality of generally horizontal strata of generally helical coils of refractory wire, the turns of each coil in a stratum being imbricate with the turns of the adjacent coils of the same stratum, said strata being superposed one above the other.

2. Airstrip as claimed in claim 1, wherein the axes of the coils in one stratum are substantially perpendicular to the axes of the coils in the next adjacent stratum extending above or underneath it.

3. Airstrip as claimed in claim 1, comprising further a protective coating interposed between the ground and the lowermost stratum of coils, said coating comprising metal plates juxtaposed with clearances allowing thermal expansion and joint-covers on said clearances whereby said coating is substantially gastight.

References Cited in the file of this patent
UNITED STATES PATENTS

| | | |
|---|---|---|
| 462,217 | Emerson | Oct. 27, 1891 |
| 652,348 | Crawford | June 26, 1900 |
| 2,360,674 | Harter | Oct. 17, 1944 |
| 2,371,017 | Arthur | Mar. 6, 1945 |

FOREIGN PATENTS

| | | |
|---|---|---|
| 1,186,310 | France | Feb. 23, 1959 |